(No Model.)  2 Sheets—Sheet 1.
N. C. BASSETT.
RAILWAY CAR TRUCK.
No. 521,778.  Patented June 26, 1894.
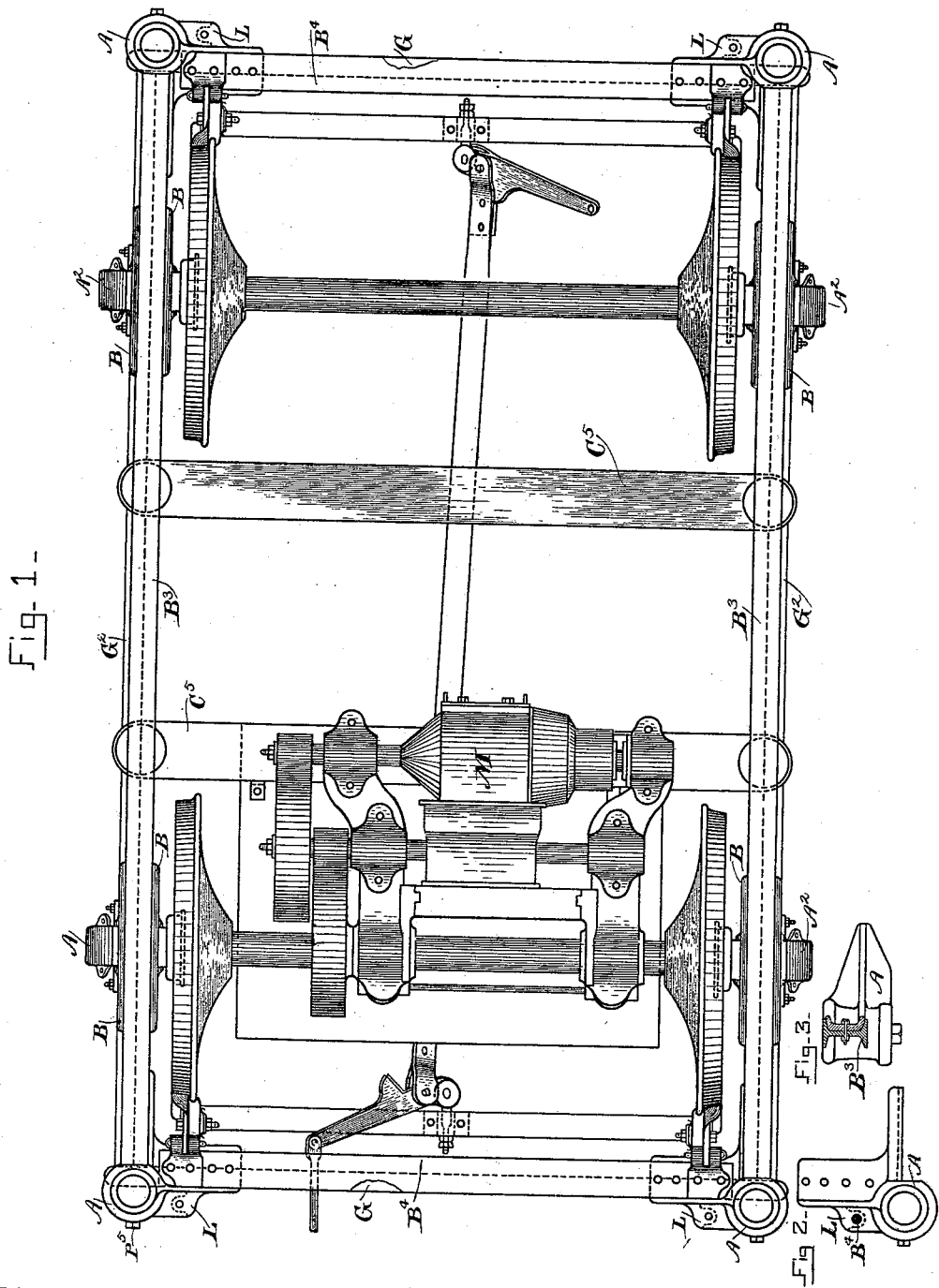
Witnesses
S. B. Thompson
N. S. Hayes
Inventor
Norman C. Bassett
by Bartley Knight
Atty.
THE NATIONAL LITHOGRAPHING COMPANY,
WASHINGTON, D. C.

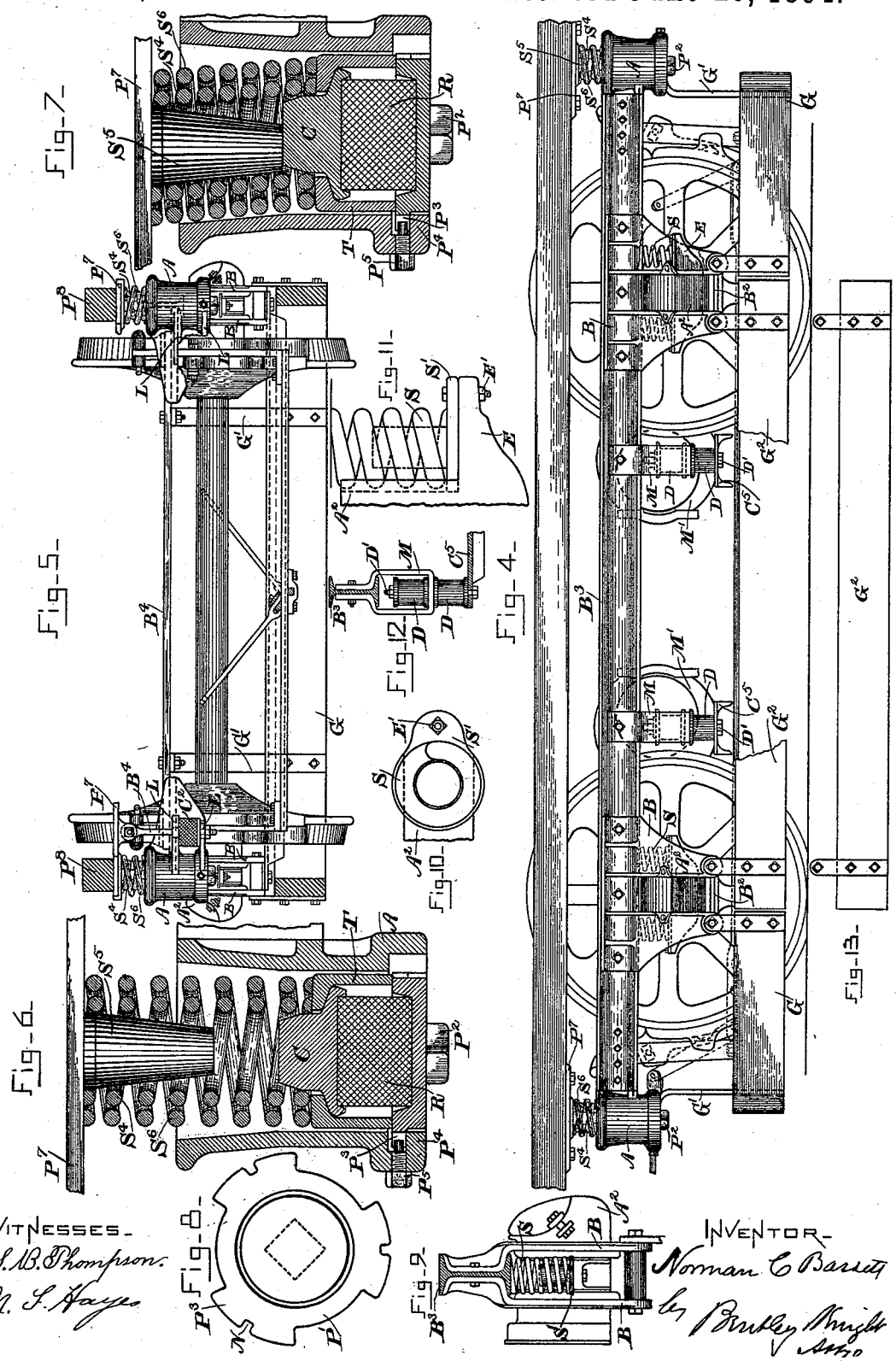

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

RAILWAY-CAR TRUCK.

SPECIFICATION forming part of Letters Patent No. 521,778, dated June 26, 1894.

Application filed April 20, 1891. Serial No. 389,566. (No model.)

*To all whom it may concern:*

Be it known that I, NORMAN C. BASSETT, a citizen of the United States, residing at Lynn, in the county of Essex and State of Massachusetts, have invented certain new and useful Improvements in Railway-Car Trucks, of which the following is a specification.

The present invention relates to truck frames for four-wheel cars and is intended to provide a truck frame which is easy of manufacture, weighs much less than the ordinary truck, will hold the axles parallel, will give free access to the motors from the side of the car, will prevent the car body from oscillating or pitching, will permit the springs to be removed and replaced without taking the car off from the truck, and will permit ready support of the free end of the motors from truck frame. These objects are accomplished by the mechanism illustrated in the accompanying drawings, in which—

Figure 1 is a plan view, showing the entire truck frame with one motor only mounted, the other motor being removed for the purpose of showing the construction more clearly. Figs. 2 and 3 are detail views of the corner casting. Fig. 4 shows a side elevation of entire truck frame. Fig. 5 shows an end elevation, partly in section, of same. Figs. 6 and 7 show sectional views of the spring box or corner casting with the springs in different positions. Fig. 8 shows a bottom view of the lower plate of the spring box. Fig. 9 shows a detail view, partly in section of the pedestal, with the axle box in side elevation. Figs. 10 and 11 show detail views of the axle box spring and its supporting casting. Fig. 12 shows a detail view, partly in section, of the supporting device for the motors. Fig. 13 shows a detail view of one part of the guard extending around the truck.

The truck frame proper consists of two side bars I-beams $B^3$, $B^3$, and the end bars $B^4$, $B^4$, connected to the side bars $B^3$, $B^3$, by the spring box or angle casting A, the whole being mounted on pedestals B, B, which by means of springs S, S, are carried on the axle boxes $A^2$, $A^2$. The lower ends or forks of pedestals B are connected together by bars $B^2$, $B^2$, by means of bolts passing through these forks. From these bolts are supported guards G, G, which are continued around the ends of the truck and further supported by the braces G', G'. The side guards $G^2$, are independent of the end guards G and are supported from the pedestals in the same manner. This construction is for the purpose of allowing the side guards G to be removed from the truck frame to permit of access to the motors from the side without having to disturb the end guards.

Pedestals B, B, are made in two castings exactly alike but bolted on the sides of the bars $B^3$, $B^3$, as shown more clearly in Fig. 9. As these pedestals are made of such a form as to fit into the bar $B^3$, and are bolted securely through it the construction is very light, readily made and exceedingly strong. The springs S, S, are mounted on plates S', S', shown also in Figs 10 and 11 in detail. This plate S' is bolted to the ear E cast with the axle box $A^2$. Now when the bolt E' is removed the plate S' and spring S can be taken out from between the bar $B^3$, and the ear E without having to raise the car more than a sufficient amount to release the tension of the spring, when a new spring can be put in its place.

The corner casting or spring box A is made partly cylindrical and partly conical, or flaring as shown more clearly in Figs. 6 and 7, and is provided at its bottom with a plate P' which can be inserted into recessed grooves in the bottom of the spring box A and partially revolved by means of a wrench on the square $P^2$, until the projections $P^3$ are supported by the corresponding projections $P^4$ at the lower end of A. To keep this plate P' from revolving so as to hold it when the truck is running the screw $P^5$ is screwed through the casting A into a notch N in the plate P'. On this plate P' is mounted a rubber spring R which carries a cap C which forms a partial guide to the interior spring $S^4$ and also receives the thrust of the stud $S^5$ when the weight of the car overcomes the tension of the supporting springs $S^4$ and $S^6$ thus bringing the weight of the car directly upon the rubber spring R which thus acts as an additional resisting spring to the downward motion of the car body. The thrust of the springs $S^4$, $S^6$, is taken upon the outside thimble T which rests directly upon the plate P' in the bottom of A. It will thus be seen that the rubber spring R is in action or is compressed only when the downward motion of the car overcomes the resistance of the springs $S^4$, $S^6$, so that the rubber spring R is an additional resistance. The ordinary construction is to put the plate on the spring R and mount the springs $S^4$ and $S^6$ directly upon this plate, which brings the entire weight of the car at all times upon the rubber spring R, but it will be noticed that the present construction does not permit any weight to come upon the rubber spring R until after the springs $S^4$ and $S^6$ are forced downward until stud $S^5$ comes in contact with cap C.

To prevent the upward motion of the car a rubber spring $C^2$ is placed between the projecting lugs L on the spring box A shown in Fig. 5. Through this spring passes a bolt or tie $B^4$ which is secured to the plate $P^7$ which is bolted to the bottom of the car sills shown at $P^8$. Now, in the normal condition, i. e. when the car has no load the springs $S^4$ and $S^6$ will set as in Fig. 6, the bolt $B^4$ having slight tension only. Should the car have occasion to lurch forward the spring $C^2$ resists this upward motion, while the downward motion is resisted by $S^4$ and $S^6$. The spring boxes A, A, are so far apart that the spring base is sufficiently large to prevent the car from pitching, and the springs $C^2$, $C^2$, also assist in preventing this pitching. There is no connection whatever between the car body and the truck excepting through the springs $S^4$ and $S^6$ and $C^2$, these resisting the up and down motion, and $S^4$ and $S^6$ also resisting the side end motion, for, as is shown in Fig. 7 when the car body pitches forward, for instance, the springs $S^4$ and $S^6$ will be forced in to the positions shown in Fig. 7, and as this requires a great deal of force the tendency of the springs $S^4$ and $S^6$ will be to at once return the car to its original position. Should the lurch or forward motion of the car be sufficient to throw the springs against the conical side of the spring box A its further motion will be positively arrested by $S^5$ coming in contact with the interior of the springs, and the motion will, therefore, be limited. This conical form of the spring box, and corresponding conical form of $S^5$ is to be made sufficient, in connection with the springs $S^4$ and $S^6$ to insure an easy stoppage of end and side motion of the car body. Now it is evident that as the only connection between the car body and truck is by the springs that the usual vibration and rattling of doors and windows will be entirely done away with, and this is one of the improvements I wish to claim. The support of suspension for the motors consists of a channel bar $C^5$ passing underneath and secured to the motor M' and supported at its outer ends from the side bars $B^3$ by means of the stirrups M, rubber springs D, D, for upward and downward motion and the bolt D' forming a flexible suspension which allows some side motion as the hole for the bolt D' through the stirrup M is sufficiently large to permit this.

What I claim as new, and desire to secure by Letters Patent, is—

1. The combination of a motor truck frame having side bars with pedestals thereon, axle boxes with side lugs, springs interposed between the side bars and side lugs, removable supports for said springs and means for clamping said supports in place.

2. A spring box for supporting car bodies, having an open bottom provided with catches and a bottom plate engaging with such catches.

3. A spring box for supporting car bodies having a removable bottom plate engaging in and closing the lower end of said box, and forming a support for the car spring.

4. A spring box for supporting car body springs, having an open bottom, a bottom plate engaging therewith by a rotary interlocking joint, and a supplementary lock to prevent rotation of the bottom plate.

5. The combination of the open bottom spring box having grooves and projections, a bottom plate having lugs entering the grooves and engaging with the projections, and a locking screw substantially as and for the purpose set forth.

6. The combination of the spring box, the car springs, the stud on the car body, and the cushion independent of said springs and arranged to take the impact of said stud.

7. The combination of the stud on the car body, the spring box, the spring, the sleeve supporting the spring from the bottom of the box, and the cushion and cap within said sleeve, and independently supported on the said bottom.

8. The combination of the stud on the car body, the flaring spring box, and the spring interposed between the stud and the box.

9. The combination of the tapering stud on the car body, the flaring spring box, and the spring interposed between the stud and the box.

10. The combination of the stud on the car body, the spring box supported on the truck frame, the cushion for taking the impact of said stud, and the car spring supported independently of said cushion, and interposed between the said stud and spring box.

In testimony whereof I have hereto set my hand this 17th day of April, 1891.

NORMAN C. BASSETT.

Witnesses:
JOHN W. GIBBONEY,
ELIHU THOMSON.